W. A. BUIS.
APPARATUS FOR MEASURING FLOWING WATER.
APPLICATION FILED MAY 13, 1909.
951,176.
Patented Mar. 8, 1910.
2 SHEETS—SHEET 1.
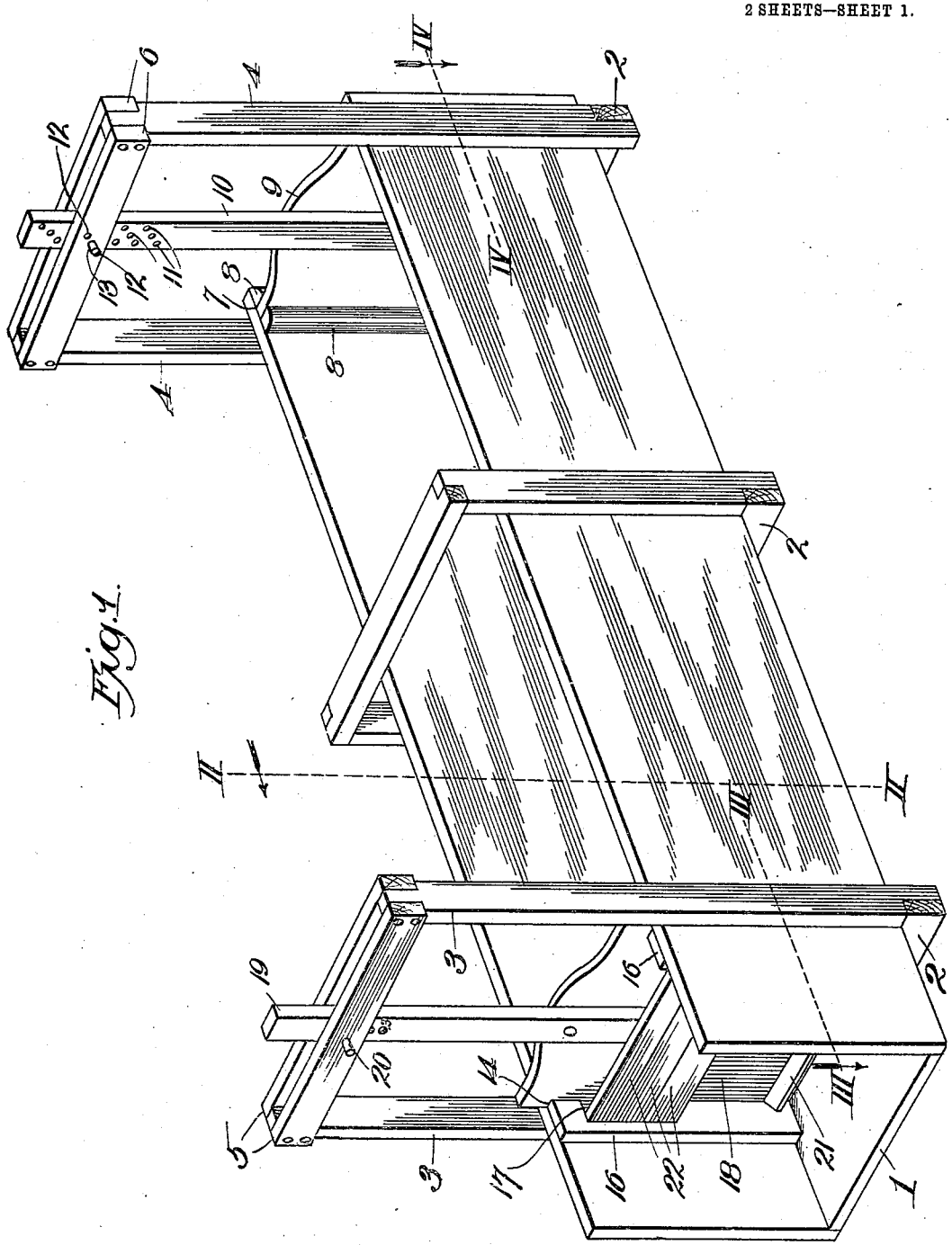

W. A. BUIS.
APPARATUS FOR MEASURING FLOWING WATER.
APPLICATION FILED MAY 13, 1909.
951,176.
Patented Mar. 8, 1910.
2 SHEETS—SHEET 2.
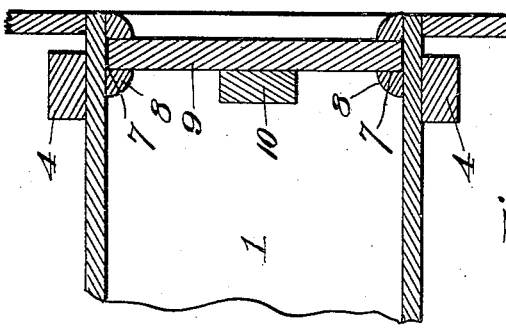
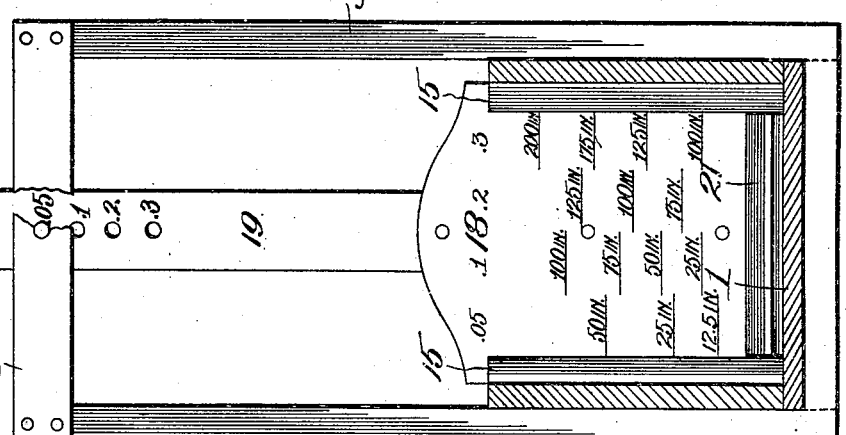
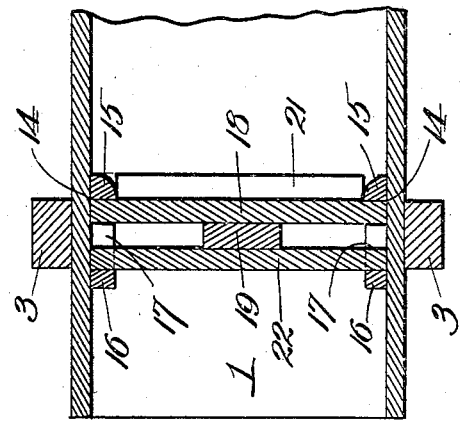
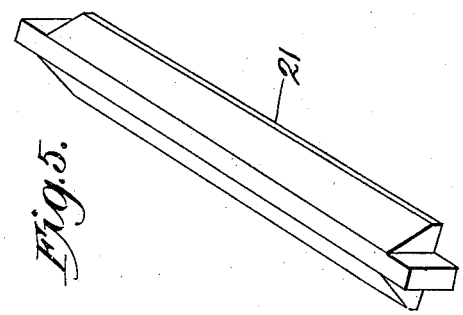
Witnesses:
Frank R. Horn
H. C. Rodger
Inventor
W. A. Buis
By George H. Thorpe
Atty.

UNITED STATES PATENT OFFICE.

WILLIAM A. BUIS, OF BOISE, IDAHO, ASSIGNOR OF ONE-THIRD TO MARK COFFIN, OF TWIN FALLS, IDAHO.

APPARATUS FOR MEASURING FLOWING WATER.

951,176.  Specification of Letters Patent.  Patented Mar. 8, 1910.

Application filed May 13, 1909. Serial No. 495,827.

*To all whom it may concern:*

Be it known that I, WILLIAM A. BUIS, citizen of the United States, residing at Boise, in the county of Ada and State of Idaho, have invented certain new and useful Improvements in Apparatus for Measuring Flowing Water, of which the following is a specification.

This invention relates to apparatus for measuring flowing water and more especially for measuring water in irrigation ditches and my object is to produce an apparatus of this character which can be made and installed economically and which embodies the desirable features of simplicity, strength and durability of construction.

With this object in view the invention consists in certain novel and peculiar features of construction and organization as hereinafter described and claimed; and in order that it may be fully understood reference is to be had to the accompanying drawings, in which:—

Figure 1, is a perspective view of an apparatus embodying the invention. Fig. 2, is a vertical section on the line II—II of Fig. 1. Fig. 3, is a section on the line III—III of Fig. 1. Fig. 4, is a section on the line IV—IV of Fig. 1. Fig. 5, is a detail perspective view of the crest-cleat.

In the said drawings where like reference characters identify corresponding parts, 1 indicates an elongated trough resting upon the cross sills 2 and secured to the inner sides of vertical bars 3 and 4, the bars 3 being connected at their upper ends by parallel cross bars 5 and the bars 4 by parallel cross bars 6, the sills 2 in connection with their respective bars or uprights 3 and 4 and the cross bars 5 and 6, constituting a pair of frames near opposite ends of the trough.

At the rear or receiving end, the trough is provided with guide grooves 7 formed by vertical cleats 8 secured to the inner sides of the trough and fitting slidingly in said grooves is a gate 9 to control the passage of water into the trough, said gate having a vertical stem 10 extending upward through the space between the cross bars 6. Said stem is provided with vertical series of holes 11 for registration with holes 12 in cross bars 6, and extending through registering holes 11 and 12, to support gate 9 at the desired elevation above the bottom of the trough is a removable cross-pin 13. By the provision of a plurality of series of holes in the stem 10 and a hole in the cross bar 6 for each series, a very fine vertical adjustment of said gate can be made.

In the vertical plane of the front frame the trough is provided internally with a pair of vertical grooves 14 formed by cleats 15 and 16 secured to the sides of the trough, the last-named cleats being provided with vertical recesses or slots 17 opening into said grooves for a purpose which hereinafter appears.

Vertically adjustable in grooves 14 is a measuring gate 18 provided at its front or inner side with a scale comprising a plurality of vertical columns headed or indicated by the characters .05, .1, .2, and .3, the first or five-hundredths column being subdivided horizontally into 12.5, 25 and 50 inch spaces or depths. The second or one-tenth column is subdivided horizontally into twenty-five, fifty, seventy-five and one-hundred inch spaces or depths. The third or two-tenths column is subdivided into seventy-five, one-hundred and one-hundred and twenty-five inch spaces or depths and the fourth or three-tenths column is subdivided horizontally into one-hundred, one-hundred and twenty-five and one-hundred and seventy-five and two-hundredth inch spaces or depths.

The gate 18 is provided with a vertical stem 19 projecting up through the space or slot formed by and between cross-bars 5, and said stem is provided with a scale corresponding to the headings of the four columns of the measuring gate, this scale of the stem consisting of holes identified by characters corresponding to those at the heads of the columns, and carried by the cross bars 5 is a pin 20 for engagement with either of said holes in the stem to support the said gate at the desired elevation above the horizontal crest-cleat 21, the engagement of the said pin with one of the holes indicating the height of the opening between the crest-cleat and the bottom of the gate, that is to say when the pin 20 engages scale hole marked .05 the bottom of the gate is five one-hundredths of an inch above the crest-cleat.

The trough will be secured in the ditch, not shown, with the upper face of the crest-cleat in the horizontal plane or above the level of any water in the ditch forward of the cleat so that the water flowing under the elevated measuring gate shall be above the level of the water forward of the cleat and thus be enabled to flow forward without opposition. In the event that the level of the dead water to the front of the measuring gate is above the crest-cleat the latter is raised to or above the level and there supported by the insertion of one or more cross bars 22, a supply of these bars being normally stored in the recesses or slots 17 of cleats 16, at which point they are always conveniently accessible.

As the use of one or more of the crest-cleat elevating cross-bars 22 will result in the disposition of the scale holes of the gate stem above the supporting pin 20, it will be advisable in practice to provide said stem with as many series of said holes as there are cross bars 22, the adjacent series being spaced apart vertically to correspond with the widths of the bars, as otherwise it will be impossible without special measurement, to readily ascertain the measure of water passing through the trough, as will be readily understood. The scales are adapted by preference to measure water in miners' inches.

In practice the measuring gate is raised until the desired scale hole in its stem registers with the pin 20 which is slipped through said hole to support the gate in such elevated position. The front or intake gate of the trough is then raised and so secured by fitting the cross-pin 13 in one of the holes of the stem of said gate. The water then enters the trough and its depth within the latter is indicated on one of the scale columns of the measuring gate, viz., the column corresponding or relating to the scale hole of the stem of said gate with which the pin 20 is engaged. It will thus be seen that the point on the column of the scale of the measuring gate with which the surface of the water within the trough registers represents the amount of water passing under the gate, that is to say if the level of the water in the trough registers with the twenty-five inch subdivision of the five one-hundredths column of the scale, and the pin 20 is in engagement with the five one-hundredths hole in the stem of said gate, twenty-five inches of water—miners' inches—will be passing under the gate.

From the above description it will be apparent that I have produced an apparatus whereby water passing through an irrigation ditch or other canal may be easily and expeditiously measured, and that the apparatus embodies the desirable features of simplicity, strength, durability and cheapness of construction and can be readily placed in or removed from operative relation to a ditch or canal.

Having thus described the invention what I claim as new and desire to secure by Letters-Patent, is:

1. A water measuring apparatus, comprising a trough provided with opposite grooves near each end, vertical bars projecting upward from opposite sides of the trough near each end, a pair of cross-bars spaced apart, connecting the upper ends of each pair of vertical bars, a gate vertically adjustable in each pair of opposite grooves and provided with a stem having holes and projecting upwardly through the space between said pairs of cross bars, and pins carried by said cross bars for engagement with the desired holes of said stems, the holes in the stem of one of the gates forming a vertical gage and the gate of said stem being equipped at one side with a scale consisting of columns headed by scale characters corresponding to those on the stem and each column subdivided and marked to identify different depths.

2. A water measuring apparatus, comprising a trough equipped at suitable distances apart with an adjustable intake gate and an adjustable measuring gate controlling the passage of water through the trough, the measuring gate having a scale on one side consisting of four columns subdivided to identify different depths of water thereon in the trough, and headed by fractional-inch characters of different denominations, a stem projecting upwardly from said gate and provided with a vertical series of holes, one for each heading of the scale on the gate and bearing a corresponding identifying character, a pin suitably supported to engage any one of said holes to support the measuring gate at the desired elevation, means to support the intake gate in opened position, and a crest-cleat extending across the trough below the measuring gate.

In testimony whereof I affix my signature in the presence of two witnesses.

WILLIAM A. BUIS.

Witnesses:
L. W. THRAILKILL,
CHAS. A. ROE.